United States Patent [19]
Cole

[11] 4,226,449
[45] Oct. 7, 1980

[54] PIPE CLAMP

[75] Inventor: Richard O. Cole, Newbury Park, Calif.

[73] Assignee: American Machine & Hydraulics, Newbury, Calif.

[21] Appl. No.: 43,173

[22] Filed: May 29, 1979

[51] Int. Cl.³ .............................................. F16L 13/14
[52] U.S. Cl. .................................. 285/382.2; 285/382.7
[58] Field of Search .................. 285/382.2, 382.1, 382, 285/382.7, 382.5, 256, 340

[56] References Cited
U.S. PATENT DOCUMENTS

| | | | |
|---|---|---|---|
| 586,438 | 7/1897 | Inshaw | 285/382.2 X |
| 1,516,397 | 11/1924 | Mueller et al. | 285/382.7 X |
| 1,699,690 | 1/1929 | Dake | 285/382.7 |
| 1,866,160 | 7/1932 | Griswold, Jr. | 285/340 |
| 2,186,974 | 1/1940 | Ice | 285/340 |
| 2,209,181 | 7/1940 | Wendel | 285/382.2 X |
| 2,470,546 | 5/1949 | Carlson | 285/382.7 X |
| 3,744,123 | 7/1973 | Vers | 285/242 X |
| 3,898,163 | 8/1975 | Mott | 285/340 X |

*Primary Examiner*—Thomas F. Callaghan
*Attorney, Agent, or Firm*—Ralph B. Pastoriza

[57] ABSTRACT

A pipe clamp useful for connecting two pipes together comprises a hollow ring or hollow toroid structure so designed that squeezing of opposite sides of the toroid deforms the hollow interior in such a manner as to contract the central opening of the toroid. Where the toroid is positioned around a pipe, the circumferential contraction of the central opening upon squeezing permanently secures the ring or clamp to the pipe. Where the ring surrounds telescoped pipe ends, the circumferential contraction of the toroid permanently secures the telescoped pipe ends together by radially inwardly deforming circumferences of the overlapped pipe ends.

1 Claim, 4 Drawing Figures

PIPE CLAMP

This invention relates generally to clamps and more particularly to an improved ring like clamp for gripping a pipe or tube, particularly useful in connecting two pipes together.

BACKGROUND OF THE INVENTION

There are many instances in which it is desired to connect two pipes together. For example, in exhaust piping for automobiles and other vehicles, there often arises a situation where one pipe end must be connected to another pipe end. Normally, one of the pipe ends can be radially expanded with an appropriate expanding die and then slipped over the pipe end so that the end portions overlap in telescoped relationship. The pipes can then be welded together or secured by some type of surrounding strap similar to hose clamps or straps.

While welding two pipe ends together is normally effective, where the pipes are subject to prolonged vibrations, the welds can fail. Where conventional type hose clamps are employed, sufficient pressure or circumferential contracting force cannot always be applied to prevent eventual working of the pipes apart, particularly if they are subject to tension forces.

BRIEF DESCRIPTION OF THE PRESENT INVENTION

With the foregoing considerations in mind, the present invention contemplates an improved type of clamp structure particularly useful for securing overlapped or telescoping ends of pipes together in connecting two pipes in a permanent manner which structure does not rely on welding but rather on a mechanical type securement.

More particularly, in accord with the present invention there is provided a yieldable material in the shape of a toroid or hollow ring so designed that squeezing of opposite sides of the hollow interior of the toroid or ring into an oblong shape in a radial direction relative to the axis of the toroid, circumferentially contracts the central opening of the toroid so that the same can be used to grip the circumference of a pipe about which the ring or toroid is passed.

Where two telescoped end portions of pipes are surrounded by the ring, the flattening of opposite sides thereof to contract the central opening results in a very secure clamping of the two pipe sections together, actual radial deformation of the side walls of the pipes taking place by the force of the deformed ring.

The resulting connections between two pipes is extremely strong and can withstand large tension forces because of the actual deformation of the circumferential wall portions in an inward radial direction.

BRIEF DESCRIPTION OF THE DRAWINGS

A better understanding of this invention will be had by now referring to a preferred embodiment thereof as illustrated in the accompanying drawings in which.

DETAILED DESCRIPTION OF THE PREFERRED EMBODIMENT

Figure 1:
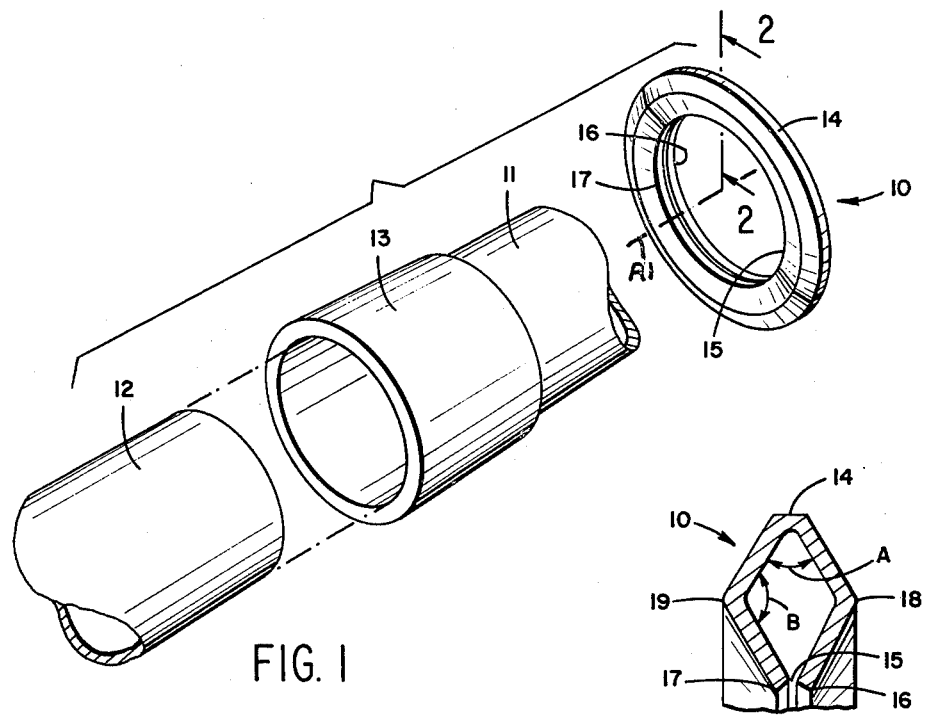
FIG. 1 is a fragmentary exploded view of two pipe ends and the clamp of this invention preparatory to being secured.

Referring first to FIG. 1, the pipe clamp of this invention is designated generally by the numeral 10 and takes the form of a yieldable material in the shape of a hollow toroid or ring.

Also shown in FIG. 1, are two pipe ends 11 and 12 the extreme end portion of the pipe 11 having been circumferentially expanded as indicated at 13 for telescopically receiving the end of the pipe 12, preparatory to these pipe ends being connected together.

In the particular example illustrated in FIG. 1, securement of the pipe ends 11 and 12 together is accomplished by the toriod or ring type clamp 10. Essentially the toroid has an outer periphery 14 and an inner circular opening or periphery 15. This central opening 15 is dimensioned to surround the telescoped ends of the pipes 11 and 12 in a fairly loose manner so that the ring can readily be positioned to surround the telescoped ends. Thereafter, and as will become clearer as the description proceeds, the opposite sides of the toroid are flattened to effect an elongation of the hollow interior in a radial direction relative to the axis A1 of the toroid. It will be appreciated that such action will circumferentially contract the central opening 15 to tightly grip the overlapped pipe ends.

Figure 2:
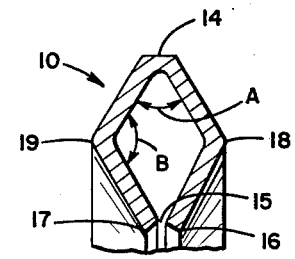
FIG. 2 is a fragmentary cross section taken in the direction of the arrows 2—2 of FIG. 1.

Referring to FIG. 2, there is shown the preferred form of the toroid 10 wherein it will be noted that the cross section of the generating closed curve for the toroid is of rhombic shape. Diagonally opposite acute vertices correspond to the outer and inner peripheries 14 and 15 described in FIG. 1, the acute angles of these peripheries being identical and indicated by the letter A in FIG. 2. The outer periphery 14 constitutes the fold line of the yieldable material while the inner circular periphery 15 is defined by adjacent annular edges of the folded material. These edges are indicated at 16 and 17 in both FIGS. 1 and 2.

Still referring to FIG. 2, the remaining vertices of the rhombus constitute obtuse angles extending annularly to define opposite sides 18 and 19 of the toroid. The opposite obtuse vertices form equal angles designated by the letter B.

Figure 3:
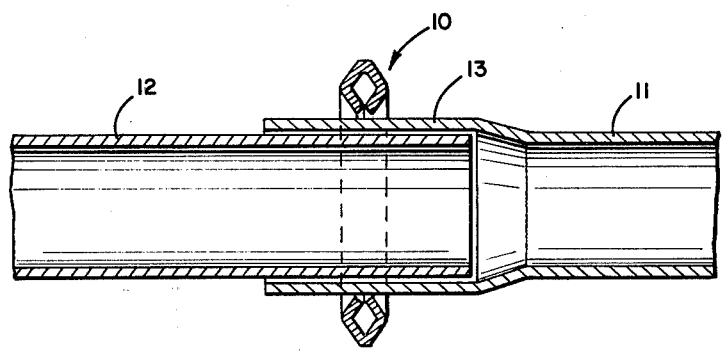
FIG. 3 is a full cross section of the pipes of FIG. 1 in assembled relationship with the ring clamp of this invention in position preparatory to securing the ends of the pipes.

Referring now to FIG. 3, the pipe clamp 10 is shown circumferentially surrounding overlapped portions of the pipes 11 and 12, preparatory to securing these telescoped portions together.

Figure 4:
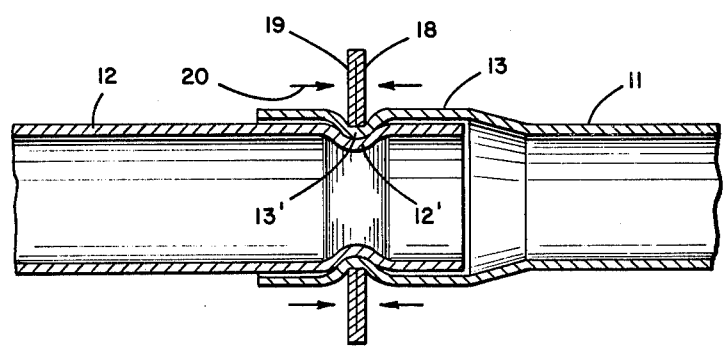
FIG. 4 is a view similar to FIG. 3 showing deformation of the pipe structures and the clamp after securement of the same has been completed.

FIG. 4 shows the manner in which the securement takes place wherein a squeezing force is applied to the opposite sides 18 and 19 of the toroid, this force being indicated by the arrows 20. Application of this squeezing force collapses the rhombus and thus necessarily causes a circumferential contraction of the central opening 15. This circumferential contraction permanently radially displaces material in both the pipe ends 13 and 12 as indicated at 13' and 12', the displacement being radially inwardly circumferentially over 360°.

As a result of the radial displacement of the material of the pipe ends, it will be evident that they are secured against longitudinal separation by tension forces. Moreover, the extremely high force exerted by the ring clamp over the entire circumference of the telescoped ends seals and permanently secures the two pipes together.

It can thus be appreciated from the foregoing that the present invention has provided a very simple and expedient means of clamping pipes and particularly of securing telescoped pipe ends together in a permanent manner by a single squeezing operation on the clamp itself.

I claim:

1. A pipe clamp made up of yieldable material folded to form a toroid, the cross section of the generating closed curve for the toroid being of rhombic shape with diagonally opposite acute vertices defining the outer and inner circular peripheries of the toroid, the outer periphery constituting a fold line and the inner periphery constituting adjacent annular edges of the folded material, the remaining vertices of the rhombus constituting obtuse angles extending annularly to define opposite sides of the toroid, whereby a squeezing force applied to the opposite sides of the toroid will flatten the rhombus shape, resulting in yielding of the material such that the circular inner periphery circumferentially contracts, whereby said clamp can be positioned to surround telescoped pipe ends and thence squeezed to contract said inner periphery to thereby annularly clamp the pipe ends into secure connected relationship.

* * * * *